US012388396B2

(12) United States Patent
Zeidman

(10) Patent No.: US 12,388,396 B2
(45) Date of Patent: Aug. 12, 2025

(54) WINDOWS FOR PRODUCING ELECTRICITY FROM SOLAR ENERGY

(71) Applicant: Moshe Zeidman, Rishon LeTsiyon (IL)

(72) Inventor: Moshe Zeidman, Rishon LeTsiyon (IL)

( * ) Notice: Subject to any disclaimer, the term of this patent is extended or adjusted under 35 U.S.C. 154(b) by 0 days.

(21) Appl. No.: 16/988,743

(22) Filed: Aug. 10, 2020

(65) Prior Publication Data
US 2021/0226582 A1 Jul. 22, 2021

Related U.S. Application Data

(60) Provisional application No. 62/961,882, filed on Jan. 16, 2020.

(51) Int. Cl.
*H02S 40/44* (2014.01)
*F24S 10/50* (2018.01)
*F24S 70/60* (2018.01)

(52) U.S. Cl.
CPC .............. *H02S 40/44* (2014.12); *F24S 10/50* (2018.05); *F24S 70/60* (2018.05); *F24S 2070/62* (2018.05)

(58) Field of Classification Search
CPC . H02S 40/44; F24S 70/60; F24S 10/50; F24S 2070/62
See application file for complete search history.

(56) References Cited

U.S. PATENT DOCUMENTS

| | | | | | |
|---|---|---|---|---|---|
| 3,287,901 | A | * | 11/1966 | Taner | F24S 10/744 60/671 |
| 4,034,569 | A | * | 7/1977 | Tchernev | F25B 17/08 62/235.1 |
| 4,111,189 | A | * | 9/1978 | Dizon | F28D 20/025 126/714 |
| 4,373,308 | A | * | 2/1983 | Whittaker | F24S 10/50 52/173.3 |
| 2005/0217275 | A1 | * | 10/2005 | Hendrickson | F02C 1/02 128/200.24 |
| 2008/0308090 | A1 | * | 12/2008 | Clive | H01L 31/052 136/246 |
| 2012/0279555 | A1 | * | 11/2012 | Sandmæl | H01L 31/0521 126/674 |
| 2013/0160821 | A1 | * | 6/2013 | Dag | H02S 40/44 438/66 |

(Continued)

FOREIGN PATENT DOCUMENTS

| | | | | |
|---|---|---|---|---|
| CN | 102395517 | * | 3/2012 | |
| CN | 102395517 | A * | 3/2012 | ............ F16L 59/025 |

*Primary Examiner* — Uyen M Tran
(74) *Attorney, Agent, or Firm* — Patshegen IP; Moshe Pinchas

(57) ABSTRACT

A system for producing electricity from solar energy is provided. The system includes a window pan for installing on building such that solar radiation impinges thereon, a heat receiving element coupled to the window pan and being configured to receive heat from the solar radiation. The system further includes a gas line thermally coupled to the heat receiving element with a heat transferring member the gas line having a liquid gas being configured to evaporate by the heat generated by the heat receiving element and to increase thereby pressure in the gas line. The system further includes a turbine having a rotor configured to convert rotating motion to electricity, the turbine being configured to receive evaporated gas from the gas line and the evaporated gas is configured to rotate the motor.

14 Claims, 3 Drawing Sheets

(56) References Cited

U.S. PATENT DOCUMENTS

2014/0130846 A1* 5/2014 Kwon ................... F24S 70/60
                                                    136/248
2016/0081282 A1* 3/2016 Salomon ............ G02B 19/0042
                                                    359/636

* cited by examiner

WINDOWS FOR PRODUCING ELECTRICITY FROM SOLAR ENERGY

FIELD OF INVENTION

The presently disclosed subject matter relates to a system for producing electricity from solar energy in general, and in particular to a system for integration in windows.

BACKGROUND

The market for alternative power production using renewable sources is growing owing to advances in materials, the tremendous reduction in costs of such systems, and the growing desire to use means other than fossil fuels. The most plentiful of these resources is the Sun and there are several ways to generate electricity making use of it. Currently, the lowest cost of these is to devise a system using Photo Voltaic (PV) panels.

Here, electrical energy will be produced cheaper than any other means of exploiting the Sun. However, when combined with the additional need of hot water (all domestic dwellings and a very large percentage of commercial, and virtually all industrial centers), a different system is more cost effective.

SUMMARY OF INVENTION

There is provided in accordance with an aspect of the presently disclosed subject matter a system for producing electricity from solar energy. The system includes a window pan for installing on building such that solar radiation impinges thereon, a heat receiving element coupled to the window pan and being configured to receive heat from the solar radiation. The system further includes a gas line thermally coupled to the heat receiving element with a heat transferring member the gas line having a liquid gas being configured to evaporate by the heat generated by the heat receiving element and to increase thereby pressure in the gas line. The system further includes a turbine having a rotor configured to convert rotating motion to electricity, the turbine being configured to receive evaporated gas from the gas line and the evaporated gas is configured to rotate the motor The heat receiving element is a copper plate disposed along a portion of the window pan. The gas line extends along an edge of the copper plate to receive heat therefrom and further extends away from the window pan towards the turbine.

The gas can be configured to shift between a liquid state and a gaseous state, and wherein the gas is shifted from liquid state to gaseous state as a result of the heat from the heat receiving element. The gas can be freon.

The heat receiving element can be a copper plate disposed along a portion of the window pan and the pipeline extends along the copper plate.

The heat transferring member can include a pipeline coupled to the heat receiving element and a liquid container, the pipeline can be configured to transfer thermal conductive liquid to the liquid container and the gas line extends through the liquid container such that gas in the gas line is heated by the thermal conductive liquid.

The gas line can be in a form of a spring increasing thereby the path of the gas pipe inside the container.

The window pan can include two pan defining therebetween an inner space and wherein the heat receiving element is disposed inside the inner space. The inner space can include thermo liquid configured to retain heat when no solar radiation is available.

The system can further include a liquid pump for forcing the liquid gas towards the window pan.

The system can further include a cooling device configured to cool off the gas from the turbine so as to shift the gas to the liquid state thereof. The system can further include a heat exchanger configured to receive heated gas from the turbine and liquid gas from the cooling device and being further configured to exchange heat between the heated gas and the liquid gas, the heat exchanger is configured to feed the liquid gas back towards the heat transferring member and to preheat the liquid gas before entering the heat transferring member.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1:
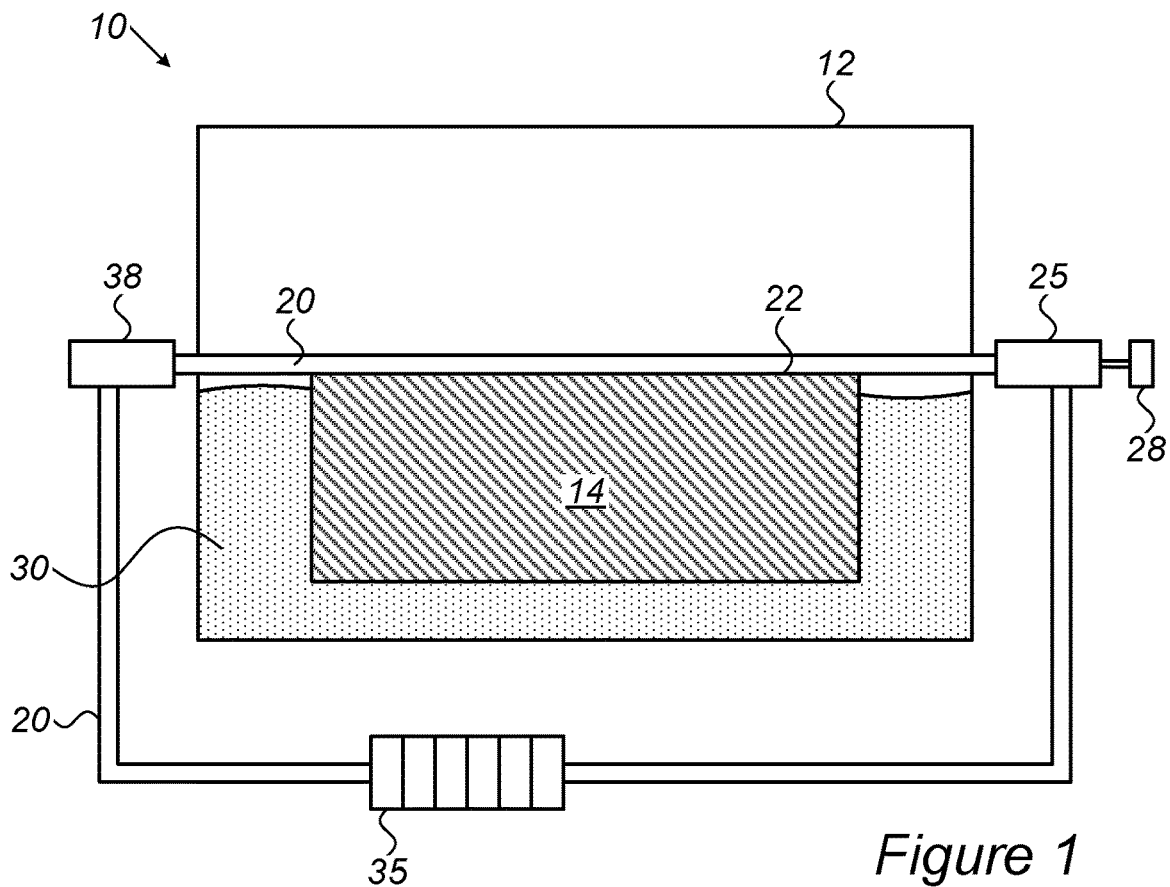
FIG. 1 is block diagram illustration of the system for producing electricity from solar energy in accordance with an example of the presently disclosed subject matter.
Figure 2:
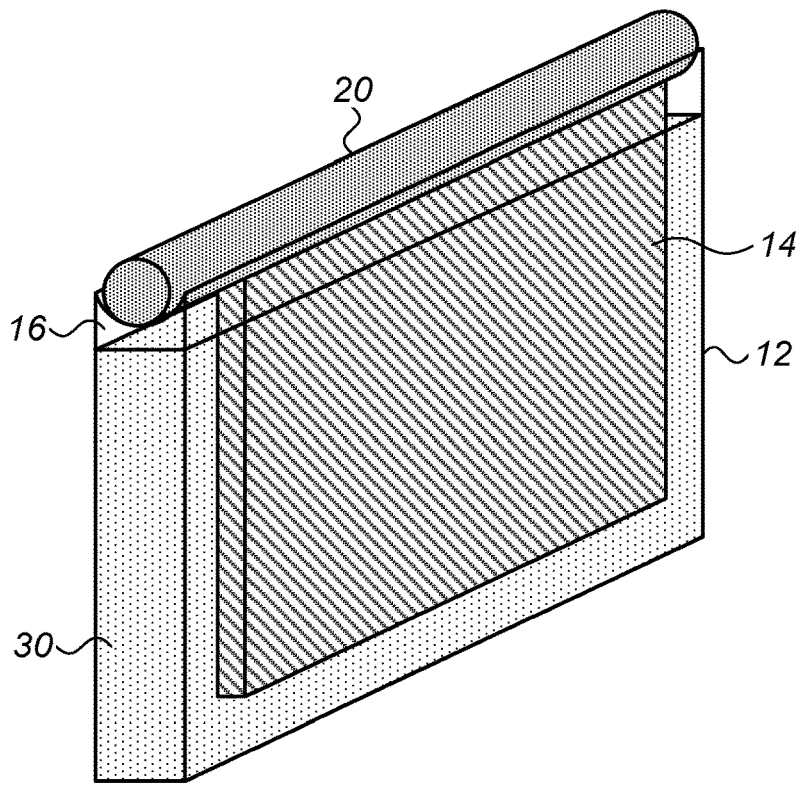
FIG. 2 is a side perspective illustration of a window pan of the system of FIG. 1.

FIGS. 1 and 2 show a system 10 for producing electricity from solar energy, the system includes a window pan 12 for installing on building (not shown) such that solar radiation impinges thereon. The window pan 12 according to an example can be a fully transparent window configured to allow sunlight to be transfer to the building, such that the window serves as a regular window allowing sunlight into the building. According to another example the window pan 12 can be coated with a filtering layer allowing only some of the radiation through the window pan.

The system further includes a heat receiving element 14 coupled to the window pan 12 and being configured to receive heat from the solar radiation. According to the illustrated example the window pan 12 includes two pans disposed in parallel with each other and defining an inner space 16 therebetween. The heat receiving element 14 is disposed in the inner space 16 and is configured to collect heat from the solar radiation. According to the illustrated example, the heat receiving element 14 is a metal plate, such as copper, configured to absorbed heat from the solar radiation. It is appreciated that the size of the metal plate can be smaller than the size of the window pan 12. That is to say, since the metal plate blocks light of the solar radiation, the metal plate 14 can be disposed only at a certain portion of the window pan 12 leaving other portions of the window pan 12 exposed, allowing thereby sunlight to enter the building.

According to an example the inner space 16 has vacuum, facilitating thereby heat retention in the window pan 12.

The system further includes gas line 20 thermally coupled to the heat receiving element 14 with a heat transferring member 22. The gas line 20 according to the illustrated example is disposed along one edge of the metal plate 14, and is coupled thereto by heat transferring member 22 which according to the illustrated example are metal coupling members transferring heat accumulated in the metal plate 14 towards the gas line 20.

The gas line 20 includes a liquid gas which is heated by the heat generated by the heat receiving element 14. The gas is selected such that its thermodynamic properties allow the gas to evaporate by the heat generated by the heat receiving element 14 and to increase thereby pressure in the gas line. I.e., the gas is selected such it shifts in the system between liquid state and gaseous state, thereby providing pressure gradient. In other words, the gas is selected such that the evaporating points thereof is at a temperature which can be achieved by the heat from the heat receiving element 14. This way, when the temperature of the gas is below evaporating points the gas is in its liquid state. The gas line 20 extends out of the window pan 12 away from the heat receiving element 14 such that gas in portions of the gas line 20 which are not in contact with the heat receiving element 14 cools off. As a result, the gas can be heated by the metal plate 14 to its evaporating point increasing thereby the pressure in the pipeline and when the gas is transferred away from the window pan 12 the gas is cooled off back to its liquid state.

Moreover, it is desired to use gas which has a relatively high PSI difference between its liquid state and gaseous state, such that shifting the gas to its gaseous states provides high pressure. More particular, in order to provide sufficient energy which can be converted to electrical energy is it desired that the pressure obtained in the gaseous state provides an additional 100 PSI, which can be utilized to operate a generator. For example, it is desired that when the gas is converted to its gaseous state the pressure is at least 300 PSI and when in the liquid state the pressure is 200 PSI. This way, the generator can consume 100 PSI for generating electric energy.

Moreover, since the system requires that the gas is converted from its liquid state to its gaseous state, after the gas had operated the generator, the gas must be converted back to its liquid state so as to allow another cycle of shifting from liquid state to gaseous state. The latter is achieved by cooling the gas to its condensing temperature. In order to avoid investing energy in cooling the gas to its condensing temperature, the gas is selected such that its condensing temperature is reached under the pressure at the exit of the generator. In other words, the condensing temperature of each gas depends on the pressure in the system, thus, since the generator reduces the pressure, the gas can be selected such that reduction in pressure facilitate brining the gas to its condensing temperature.

An example of such gas is Freon Refrigerant-R422 which has an evaporating temperature of 70° Celsius, and its condensing temperature is 38° Celsius at 200 PSI. Freon Refrigerant-R422 further has an expansion coefficient gas which provides high pressure of 300 PSI and more when the gas is converted to its gaseous state.

Thus, the Freon Refrigerant-R422, reaches 300 PSI when evaporating, and after exiting the generator when the gas is at 200 PSI, the gas needs to be cooled off only to 38° Celsius in order to be converted back to liquid. This way, simple means can be used to cool off the gas, such as a radiator, and not much energy is required for cooling the gas.

The system 10 further includes a turbine 25 having a rotor 28 configured to convert rotating motion to electricity. The turbine 25 is coupled to the gas line 20 and is configured to receive evaporated gas from the gas line 20 such that the evaporated gas rotates the rotor. By way of example, the pressure of the gas when entering the turbine is 300 PSI and when exiting the turbine it is 200 PSI. Thus, the turbine converts 100 PSI to electrical energy.

The gas line further extends from the turbine back to the window pan 12 forming a close loop. It will be appreciated that since the energy provided by the gas is formed by conversion of the heat to pressure, it is desired to have the gas shifting between gaseous state and liquid state, such that when the gas is converted to its gaseous state pressure in the gas line rises. In order to maximize the energy produced by the gas, it is desired to shift the gas exiting the turbine 25 from the gaseous state back to its liquid state, such that the liquid gas can be fed back to the window pan and be heated again. Thus, while the energy from the pressurized gas is utilized for motorizing the rotor, pressure in the gas line exiting the turbine 25 is reduced and consequently, the temperature of the gas is lowered. It is however required that the gas is further cooled off to a temperature lower than the evaporating point of the gas, so the gas is shifted back to its liquid state. For that the system can include a cooling device 35 such as a radiator or other cooling system such as carnot cycle etc.

The gas is then fed back to the portion of the gas line 20 attached to the metal plate 14 such that the gas is heated again by the metal plate 14 shifting the gas again to its gaseous state and allowing another cycle of the pressurized gas towards the turbine 25.

Since the liquid gas entering the window pan is under a lower pressure than the gas in its gaseous state, a liquid pump 38 may be used so as to force the liquid gas towards the metal plate 14.

The system thus produces thermal energy without consumption of expensive resources and allows reaching high temperature such that the required energy level is available.

The system can further include thermo liquid 30 disposed in side the inner space 16, so as to accumulate the heat of the solar radiation. The thermo liquid 30, which can be oil, is configured to maintain the heat accumulated during the day light hours and to heat the metal plate 14 when no solar heat is available. This way, the system 10 produces electricity even when there is no immediate solar radiation.

The system thus provides means for energy accumulation, instead of utilizing batteries and the like to store electrical energy the windows store thermal energy and the system converts the thermal energy to electric energy. It is appreciated that the thermo liquid can be configured such that it retains the temperature for the duration of time in which there is no solar radiation, i.e. the hours of the night. The thermo liquid can be further configured to heat the gas to the required temperature so as to convert the gas from its liquid state to gaseous state.

Figure 3:
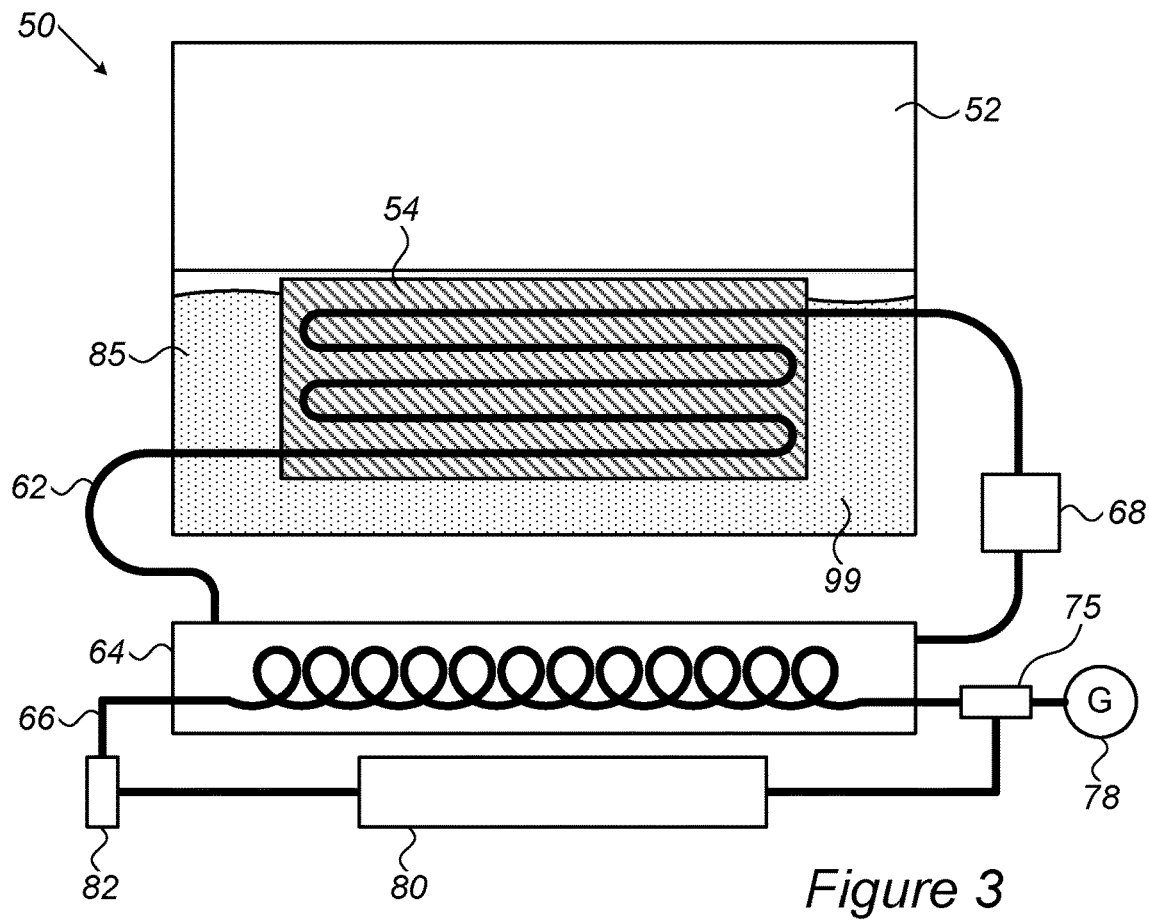
FIG. 3 is block diagram illustration of the system for producing electricity from solar energy in accordance with another example of the presently disclosed subject matter.
Figure 4:
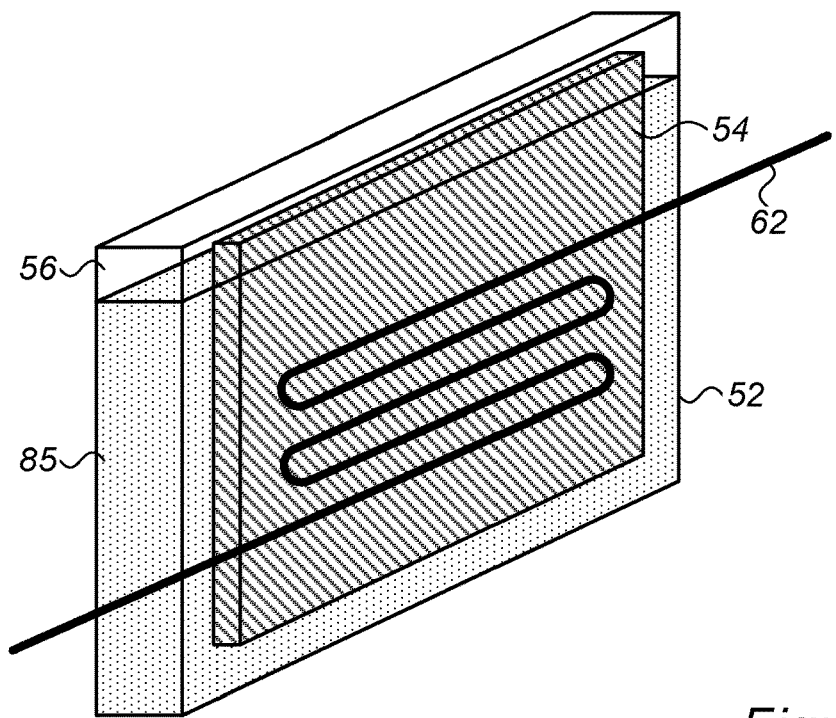
FIG. 4 is a side perspective illustration of a window pan of the system of FIG. 3.

FIGS. 3 and 4 show another example of a system 50 for producing electricity from solar energy, the system includes a window pan 52 for installing on building (not shown) such that solar radiation impinges thereon. The window pan 52 according to an example can be a fully transparent window configured to allow sunlight to be transfer to the building, such that the window serves as a regular window allowing sunlight into the building.

The system 50 further includes a heat receiving element 54 coupled to the window pan 52 and being configured to receive heat from the solar radiation. According to the illustrated example the window pan 52 includes two pans disposed in parallel with each other and defining an inner space 56 therebetween. The heat receiving element 54 is disposed in the inner space 56 and is configured to collect heat from the solar radiation. According to the illustrated example, the heat receiving element 54 is a metal plate, such as copper, configured to absorbed heat from the solar radiation. It is appreciated that the size of the metal plate can be smaller than the size of the window pan 52. That is to say, since the metal plate blocks light of the solar radiation, the metal plate 54 can be disposed only at a certain portion of the window pan 52 leaving other portions of the window pan 52 exposed, allowing thereby sunlight to enter the building.

According to an example the inner space 56 has vacuum, facilitating thereby heat retention in the window pan 52.

The system further includes a heat transferring member 62, which according to the illustrated example is a pipeline extending along the metal plate 54, and having liquid configured to absorbed heat from the metal plate 54. According to the illustrated example the pipeline 62 extends along an undulated path, so as to increase the length of the path of the pipeline along the metal plate 54 increasing thereby the exposure of the thermo pipeline 62 to the heat of absorbed by the metal plate 54.

The pipeline 62 extends out of the window pan 52 toward a liquid container 64 transferring the heated liquid thereto. The container includes gas line 66 having a liquid gas which is heated by the liquid inside the container 64. The pipeline 62, the container 64 and the liquid therein thus serves as a heat transferring member for transferring heat from the metal plate 54 to the gas line 66. The gas line 66 inside the container acts as a heat exchanger, heating the liquid gas and cooling off the liquid in the container 64. The pipeline extends from the container back towards the window pan 52 in a close loop to heat the liquid again. To facilitate the flow of the liquid in the pipeline 62 especially the cooled off liquid entering the window pan 42, a liquid pump 68 can be integrated in the pipeline 62.

The gas line 66 according to the illustrated example is in a form of a spring, increasing thereby the length of path inside the container 64 and providing a better heat exchange between the liquid in the container 64 and the gas in the gas line 66.

As in the example of FIGS. 1 and 2, the gas line 66 includes a liquid gas which is heated by the liquid inside the container 64. The gas is selected such that its thermodynamic properties allow the gas to evaporate by the heat in the container 64 and to increase thereby pressure in the gas line. I.e., the gas is selected such it shifts in the system between liquid state and gaseous state, thereby providing pressure gradient. In other words, the gas is selected such that the evaporating points thereof is at a temperature which can be achieved by the heat inside the container 64. This way, when the temperature of the gas is below evaporating points the gas is in its liquid state.

The system 50 further includes a turbine 75 having a rotor 78 configured to convert rotating motion to electricity. The turbine 75 is coupled to the gas line 66 and is configured to receive evaporated gas from the gas line 66 such that the evaporated gas rotates the rotor 78.

The gas line further extends from the turbine back 75 back to the container 64 forming a close loop. Thus, while the energy from the pressurized gas is utilized for motorizing the rotor, pressure in the gas line exiting the turbine 75 is reduced and consequently, the temperature of the gas is lowered. The gas is then heated again by the liquid in the container 64 further pressurizing the gas and allowing another cycle of the gas towards the turbine 75.

The gas line 66 extends out of the container 64 such that gas in portions of the gas line 66 which are not in contact with the liquid inside the container 64 cools off. As a result, the gas can be heated by the heat transfer from the metal plate 54 to its evaporating point increasing thereby the pressure in the pipeline and when the gas is transferred away from the container 64 the gas is cooled off back to its liquid state. It is however required that the gas is further cooled off to a temperature lower than the evaporating point of the gas, so the gas is shifted back to its liquid state. For that the system can include a cooling device 80 such as a radiator or other cooling system such as carnot cycle etc., Furthermore, a gas liquid pump 82 may be used so as to force the liquid gas towards the container 64.

Finally, as in the example of FIGS. 1 and 2, the system 50 can further include thermo liquid 85 disposed in side the inner space 56, so as to accumulate the heat of the solar radiation. The thermo liquid 85 is configured to maintain the heat accumulated during the day light hours and to heat the metal plate 54 when no solar heat is available. This way, the system 50 produces electricity even when there is no immediate solar radiation.

By way of example, power required per square meter on a single floor in a tall building is 16 W/m², and for a floor of 2500 m² the required energy is 40 kW.

The power available from the sun is 600 W/m² and considering a 60% efficiency of the collectors, in order to provide 40 kW collectors in an area of 110 m² are required. i.e.:

$$40,000/(600*0.6)=110.$$

It is appreciated that the above process, which is in essence a Organic Rankine Cycle (hereinafter ORC), maybe further improved so as to enhance its efficiency.

One method of improving efficiency is to recover energy not used by the turbine and return it to the system rather than losing it in the cooling device. Note that if an ORC is, for example 16% efficient, it means that 84% of the energy is being lost. It is the purpose of heat recovery to try to capture a fraction of this lost energy.

Figure 5:
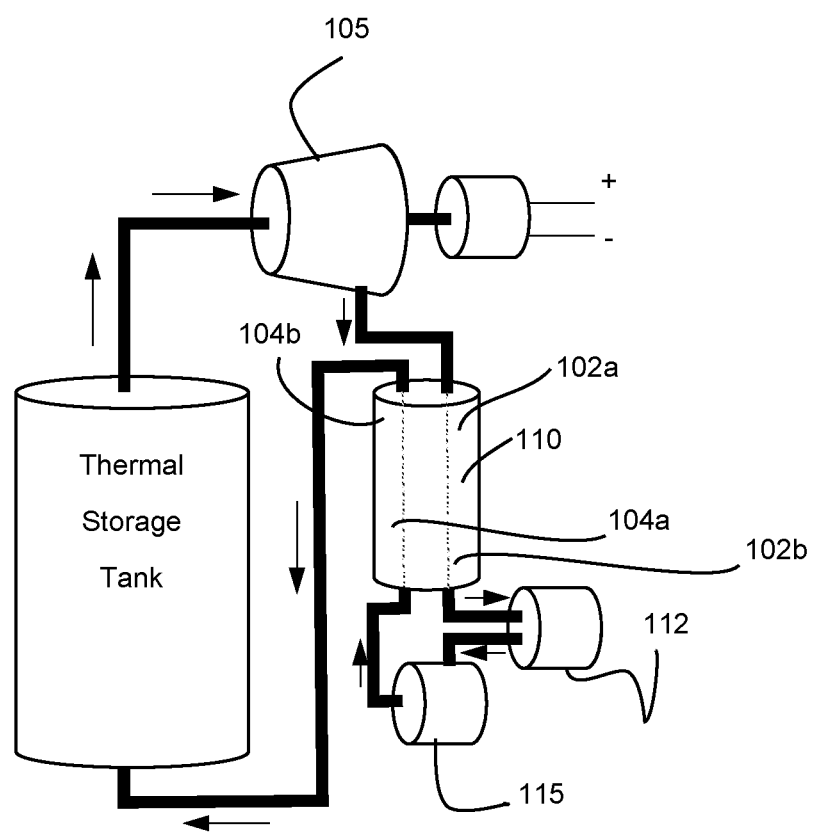
FIG. 5 is block diagram illustration of the system for producing electricity from solar energy in accordance with yet another example of the presently disclosed subject matter.

In the process, the gas leaving the turbine immediately enters the cooling device, such as a chiller. According to an example, illustrated in FIG. 5, a heat exchanger 110 can be placed between the turbine 105 and the chiller 112 in which the gas leaving the turbine 105 enters the heat exchanger 110 before going to the chiller 112. The heat exchanger 110 is further connected to the pump 115 which receive the cooled gas from the chiller 112 and forces it bac into the heat exchanger 110.

Thus, while the gas entering the heat exchanger 110 from the turbine 105 has an elevated temperature the cooled gas entering the heat exchanger 110 from the chiller 112 is at a lower temperature. Thus the cooled gas, which is already in its liquid phase, upon becoming in contact with the warmer gas will heat up, thus capturing some of the otherwise lost energy. This reduces the amount of energy then required to elevate the temperature of the liquid to boiling and to accomplish the phase change which would otherwise be done by the heat from the window pan. This then requires the heat from the window to give up less energy on each pass of the liquid through it in order to get to the driving conditions for the turbine and improves the overall efficiency.

As shown in the illustrated example, the heat exchanger 110 includes sections 102a, 102b, 104a and 104b, which correspond to various conditions of the gas inside the heat exchanger. The station 102a is where the heated gas from the turbine 105 enters the heat exchanger 110 and is cooled enough to begin liquifying. Station 102b is the final condition of the working fluid after it leaves the heat exchanger before entering the chiller 112. Station 104a is where the liquid from the pump 115 within the heat exchanger 110 has absorbed enough energy to reach its evaporation temperature and begins to evaporate. Station 104b is the final state of the working fluid as it leaves the heat exchanger before entering the tank.

Those skilled in the art to which the presently disclosed subject matter pertains will readily appreciate that numerous changes, variations, and modifications can be made without departing from the scope of the invention, mutatis mutandis.

The invention claimed is:

1. A system for producing electricity from solar energy, the system comprising:
    a window for installing on a building such that solar radiation impinges thereon, said window includes a windowpane having a first portion and a second portion, each one of said first and second portions includes a first pan facing outside the building and a second pan facing inside the building defining therebetween an inner space,
    wherein the inner space of said first portion is configured to allow sunlight impinging on the first pan of said first portion to be transferred to the building through the inner space of said first portion, and wherein the inner space of said second portion is filled with a thermo liquid, such that solar radiation directly impinging on the first pan of said second portion reaches the inner space of said second portion;
    a heat-receiving element disposed inside the inner space of said second portion and being immersed inside said thermo liquid, such that solar radiation impinging on the first pan of said second portion is converted to heat by said heat receiving element, wherein said thermo liquid is configured to retain heat when no solar radiation is available;
    gas line thermally coupled to said heat receiving element with a heat transferring member said gas line having a liquid gas being configured to evaporate by the heat generated by said heat receiving element and to increase thereby pressure in said gas line;
    a turbine having a rotor configured to convert rotating motion to electricity, said turbine being configured to receive evaporated gas from said gas line and said evaporated gas is configured to rotate said rotor.

2. The system of claim 1 wherein said heat transferring member includes a pipeline coupled to said heat receiving element and a liquid container, said pipeline being configured to transfer thermal conductive liquid to said liquid container and said gas line extends through said liquid container such that said liquid gas in said gas line is heated by said thermal conductive liquid.

3. The system of claim 1 wherein said heat receiving element is a copper plate disposed along a portion of said windowpane.

4. The system of claim 3 wherein said gas line extends along an edge of said copper plate to receive heat therefrom and further extends away from the windowpane towards said turbine.

5. The system of claim 1 wherein said liquid gas is configured to shift between a liquid state and a gaseous state, and wherein said liquid gas is shifted from liquid state to gaseous state as a result of the heat from said heat receiving element.

6. The system of claim 5 wherein said gas is freon.

7. The system of claim 5 wherein said liquid gas generates pressure of at least 100 PSI when shifting from its from liquid state to gaseous state.

8. The system of claim 5 wherein said liquid gas when shifting from its from liquid state to gaseous state generates pressure at a rate which corresponds to the amount of energy consumed by said turbine.

9. The system of claim 8 wherein pressure of the liquid gas when entering the turbine is at least 300 PSI and pressure of the liquid gas when exiting the turbine is lower than 200 PSI.

10. The system of claim 2 wherein said heat receiving element is a copper plate disposed along a portion of said windowpane and said pipeline extends along said copper plate.

11. The system of claim 2 wherein said gas line is in a form of a spring increasing thereby the path of said gas line inside said liquid container.

12. The system of claim 1 further comprising a liquid pump for forcing the liquid gas towards the windowpane.

13. The system of claim 1 further comprising a cooling device configured to cool off the liquid gas from the turbine so as to shift the liquid gas to the liquid state thereof.

14. The system of claim 13 further comprising a heat exchanger configured to receive heated gas from the turbine and said liquid gas from said cooling device and being further configured to exchange heat between the heated gas and the liquid gas, the heat exchanger is configured to feed said liquid gas back towards said heat transferring member and to preheat said liquid gas before entering said heat transferring member.

* * * * *